United States Patent
Piël et al.

(10) Patent No.: US 11,870,837 B2
(45) Date of Patent: Jan. 9, 2024

(54) COMPUTER-IMPLEMENTED CO-BROWSING METHOD AND SYSTEM FOR WEB PLATFORM VIRTUALIZATION OF WEB APPLICATIONS USING A NETWORK PROXY AND FUNCTION-WRAPPING ENGINE

(71) Applicants: Nicholas Piël, Amsterdam (NL); Maxim Tsoy, Amsterdam (NL); Ian Birch, Englewood, CO (US)

(72) Inventors: Nicholas Piël, Amsterdam (NL); Maxim Tsoy, Amsterdam (NL); Ian Birch, Englewood, CO (US)

( * ) Notice: Subject to any disclaimer, the term of this patent is extended or adjusted under 35 U.S.C. 154(b) by 0 days.

(21) Appl. No.: 18/058,129

(22) Filed: Nov. 22, 2022

(65) Prior Publication Data
US 2023/0231899 A1 Jul. 20, 2023

Related U.S. Application Data

(60) Provisional application No. 63/282,119, filed on Nov. 22, 2021.

(51) Int. Cl.
*H04L 67/02* (2022.01)
*G06F 9/4401* (2018.01)
*G06F 9/54* (2006.01)
*H04L 67/568* (2022.01)

(52) U.S. Cl.
CPC ............ *H04L 67/02* (2013.01); *G06F 9/4401* (2013.01); *G06F 9/547* (2013.01); *H04L 67/568* (2022.05)

(58) Field of Classification Search
None
See application file for complete search history.

(56) References Cited

U.S. PATENT DOCUMENTS

| | | | |
|---|---|---|---|
| 10,372,504 B2* | 8/2019 | Shotton | H04L 41/5003 |
| 2012/0096106 A1* | 4/2012 | Blumofe | H04L 67/06 709/213 |
| 2016/0139914 A1* | 5/2016 | Levi | G06F 11/3604 717/121 |
| 2020/0409342 A1* | 12/2020 | Zhang | H04L 67/562 |

* cited by examiner

*Primary Examiner* — Quang N Nguyen
(74) *Attorney, Agent, or Firm* — Steven Rinehart (57) ABSTRACT

A computer program product, system, and computer-implemented method for facilitating co-browsing of a web application wherein HTML and JavaScript code within a web application are wrapped and brokered to a plurality of third parties.

16 Claims, 10 Drawing Sheets

COMPUTER-IMPLEMENTED CO-BROWSING METHOD AND SYSTEM FOR WEB PLATFORM VIRTUALIZATION OF WEB APPLICATIONS USING A NETWORK PROXY AND FUNCTION-WRAPPING ENGINE

BACKGROUND OF THE INVENTION

Field of the Invention

This invention relates generally to co-browsing, or sharing a browsing session between a plurality of user agents such as web browsers, and more particularly relates to seamlessly wrapping a web application in a sandbox environment and proxying the web application to one or more user agents.

Description of the Related Art

Sharing of browsing sessions from an intermediate browser to a third-party browser is an area of focus by different co-browsing solutions providers. In such cases, one user/visitor to a webpage can follow a browsing session of another visitor in real time, and optionally take control over the session by interacting with the web application on behalf of the other user. This functionality is useful for various use cases, such as user support and interactive remote presentations. However, the simple visual synchronisation of a session from one browser to another is not sufficient to meet the needs of many users needing co-browsing solutions.

While there are several known approaches to sharing a browser session between multiple web browsers, each of the current approaches in the art has limitations which inhibit optimal co-browsing:

The first approach involves the use of WebRTC, to send an encoded video stream from one participant to the third-party participant. The contents of a web browser, for instance, can be reduced to pixels on an intermediate server and sent or "pushed" over in real time to the third-party participant's browser directly or via an intermediate WebRTC server. This approach requires access/permission be granted from the participants' OS to be implemented. Additionally, although the video stream reflects the picture from the sharing user's browser to the third-party participant, and there are no additional permissions which are needed to implement this technology, the rendered video contains no virtual controls or HTML content or JavaScript which can be integrated or loaded by the end participant. With WebRTC, you achieve only active/passive interaction (i.e., only one participant can interact directly with the web content). Because the actual web content is only loaded in the browser of one participant, active/active collaboration is not realized.

Relaying a projection of the web page to the end participant(s), is a solution which does not allow per-participant customisation of the web page content, or customization of the web page behavior. No optimal means of proxying the HTTP requests and cookies, and performing dynamic transformations of the code, exist in WebRTC.

Another co-browsing approach involves embedded JavaScript, requiring JavaScript (JS) code to be embedded on each webpage which is being co-browsed. HTML resources are served from the original web application to the final participant(s) directly without using an intermediate server. Apart from the requirement of adding custom JS code on every co-browsed page, obstacles to efficient implementation of this approach involve the HTTP cookies and resources which are required to authenticate with the web server but which cannot be passed to the third-party participant(s). This means that if participants' browsers store different sets of cookies, the web application will behave differently for different users. In this method of co-browsing, the software of the participants is configured to simply ignore session resources, which often causes web pages being synchronized in this method to load improperly or not at all. In those variations of embedded JavaScript co-browsing in which session cookies are synchronized from one user to another, the session becomes insecure, since cookies are supposed to be private by design. Additionally, synchronizing HTTP-only cookies is not possible by client-side Javascript code. Because HTTP-only cookies are accessible only by one browser, sharing a session between two web browsers is untenable with methods currently known in the art in which cookies and content cannot be brokered to the end participant(s).

Although there are technologies which attempt to overcome cookie and authentication obstacles by waiting for the resources to be loaded for the end participant before relay to the web application by the intermediate server, this approach increases latency. There is no technology in the art which allows an active participant's cookies to be passed through an intermediate server to a website while providing a projection of the original web content to multiple co-browsing parties.

Finally, although JavaScript can be placed on a webpage to deliver co-browsing functionality, JavaScript does not provide support for CSS pseudo classes such as interactive menus and native selects, thus embedded JavaScript co-browsing is also unworkable for detecting and observing the behavior of these functions. It would be desirable to provide a solution to this problem in which JavaScript does not need to be placed on a webpage to deliver co-browsing functionality. It would also be beneficial to provide a solution in the marketplace which applies to third-party web applications that are not specially prepared for being co-browsed.

The described limitations of existing co-browsing approaches can be overcome by using a proxy solution. While there are several known approaches to proxying a web application via an intermediate server, there are no efficient methods known in the art of wrapping a web application and making it accessible by a different domain address. One problem with existing "reverse proxy" solutions is that they are not able to handle dynamically generated content, such as hyperlinks constructed by client-side Javascript. Additionally, since the session state is specific to a domain name, it is problematic to transfer the user from one domain to another without losing the existing session state such as cookies and web storage.

Such a system combining a network proxy in combination with client-side sandbox could be used for purposes other than co-browsing, providing for various on-the-fly browsing enhancements, such as measuring web site performance for a subset of the website visitors, recording or auditing session information, introducing new features to the website, and others.

SUMMARY OF THE INVENTION

From the foregoing discussion, it should be apparent that a need exists for a computer-implemented co-browsing method and system for dynamic virtualization of an arbitrary web application with the goal to proxy it to one or multiple third-party participants under a different domain. Beneficially, such a method and system would allow a plurality of parties to participate in the same communication session seamlessly and transparently, while allowing fine-grained customizations of the content due to receiving HTML, and JavaScript code instead of a projection of the original page. In contrast to the existing approaches described above, it provides a scalable and traffic-efficient integration and advanced customisations while being applicable to a wide range of web applications requiring no changes in the co-browsed application itself.

The present invention has been developed in response to the problems and needs in the art that have not yet been fully solved by currently available systems, apparati and methods. Accordingly, the present invention has been developed to provide a computer-implemented method for transparently wrapping a web application to a plurality of third parties, the steps of the method comprising:
  a. establishing a communication session between: (a) a proxy server and (b) a web application served at a URL resolving to an origin server;
  b. generating and distributing two unique tokens: a leader token and a follower token;
  c. serving a proxied website to a single participant with the leader token (the "leader"), and providing a corresponding URL to participants with the follower token (the "followers"). The proxied website contains a dynamically sandboxed version of the co-browsed web application, which involves special rewriting of the client-side (Javascript) source code, HTML/CSS content, and rewriting the HTTP and WS traffic in order to handle dynamically generated content;
  d. using additional client-side code injected both on the proxied leader's page and on the followers' pages, capturing DOM mutations in the leader's browser and propagating the DOM mutations to followers' browsers;
  e. executing the sandboxed application code including event handlers only in a leader's browser;
  f. trapping arbitrary JavaScript object accessors and HTTP requests with a virtual sandbox using one or more HTML and JavaScript parsers to:
    i. inject custom hooks into HTML and JavaScript code to provide arbitrary customisations to the original application;
    ii. overriding URLs such that secondary requests are routed through the proxy server;
    iii. blocking requests configured to escape the sandbox;
    iv. if a follower needs to interact with the application, their input events may be captured and reproduced on the leader side, triggering all necessary event handler code defined by the application.

In some embodiments, the method further comprises executing a client-side script adapted to: polyfill a plurality of globals; register required event handlers such as onmessage and onscroll; and expose a plurality of globals in the sandboxed version of a web site.

In various embodiments, the method further comprises: embedding the proxied content in a plurality of iframes ("UI frames"); and communicating between nested iframes using postMessages.

In still further embodiments, the method further comprises: parsing all original JavaScript code and reconstructing it by adding custom wrappers and modified API implementations (the "modified code"); wherein the JavaScript code is modified using a plurality of processing workers adapted to apply Javascript object descriptor wrappers.

The steps of the method may also comprise executing the modified code on the browser of the leader.

In various embodiments, the method further comprises: establishing communication over postMessage and MessageChannel APIs between nested iframe (an "originating frame") and a UI frame (UIF); appending unique identifiers (SSID) to the browsed DOM elements; keeping a registry of currently loaded iframes.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are given to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The embodiments of the present invention described herein generally provide for a system, computer program product, and a method for using an online network. Those individuals and entities using a browser may be referred to as "users" or "participants." Reference to consumers or providers may include a tablet computer, smartphone, server, work station, or DPD (data processing device) under the control of the consumer, technology provider, intermediate server and the like. The technology provider may be a DPD or system of DPDs, including server(s), operating independently of the web application and end participants, configured to facilitate the receipt, maintenance and provision of information between a web application and participant.

Hence, in general terms, the present invention provides for a universal middleware solution which brokers a) network application traffic in a communication session between a web application server and an intermediate server 4 to one or more end participant(s), and b) user interaction events between the client-side application code and the APIs provided by the web browser transparently.

Figure 1:
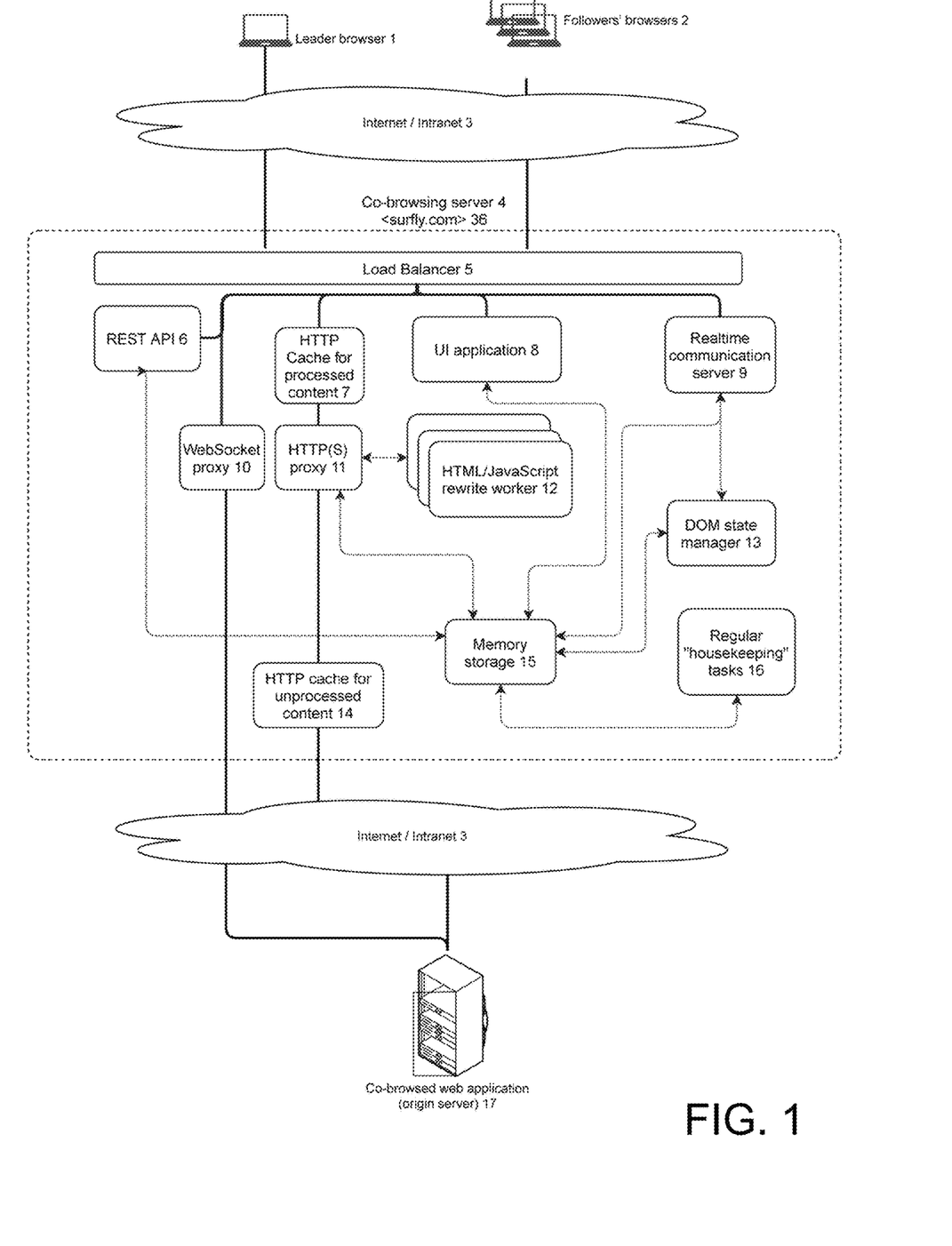
FIG. 1 is a diagram illustrating the logical architecture forming the co-browsing system for wrapping (including proxying) a web application to a plurality of third parties in accordance with the present invention.

FIG. 1 illustrates a relationship diagram of the logical architecture forming the technology provider's co-browsing system for sharing a browsing session to a plurality of web browsers in accordance with the present invention.

Figure 2:
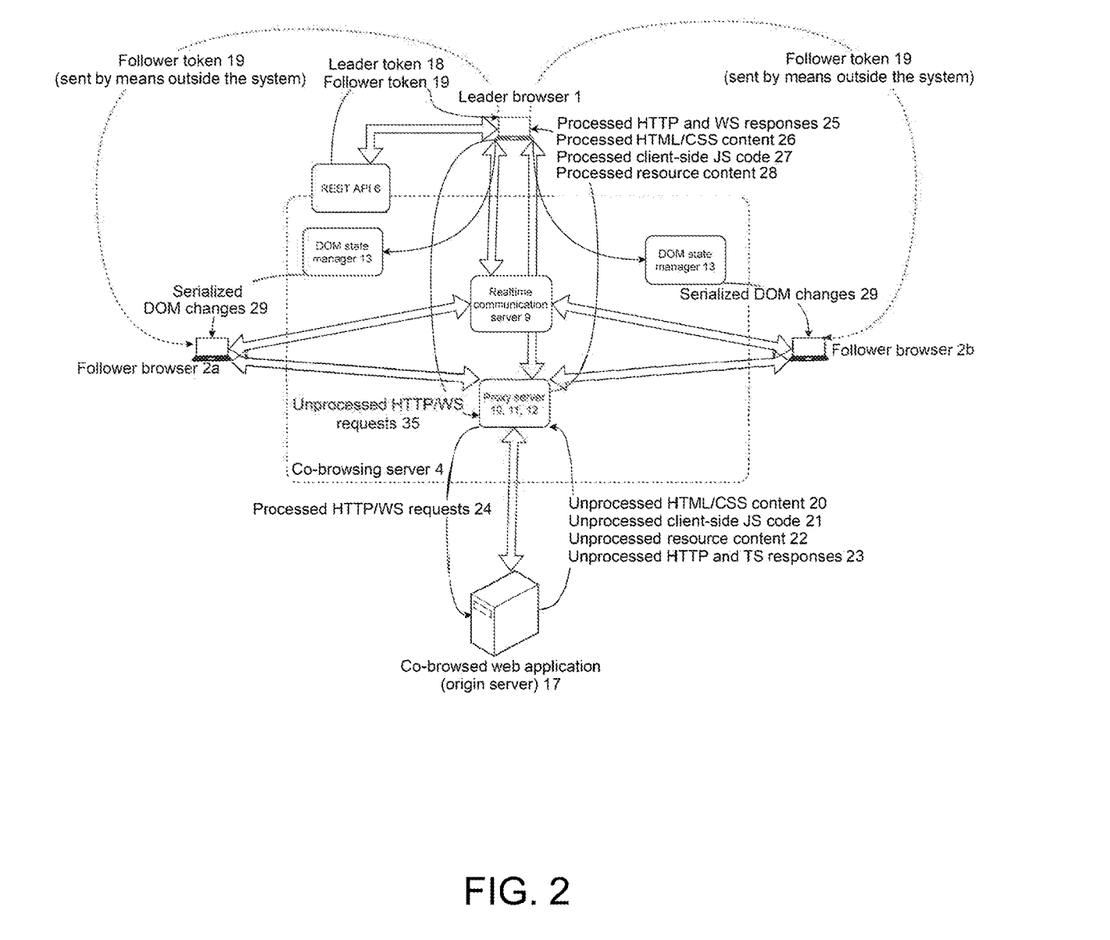
FIG. 2 is a data-entity relationship diagram illustrating data flows in a co-browsing system for proxying/wrapping a web application to a plurality of third parties in accordance with the present invention.
Figure 3:
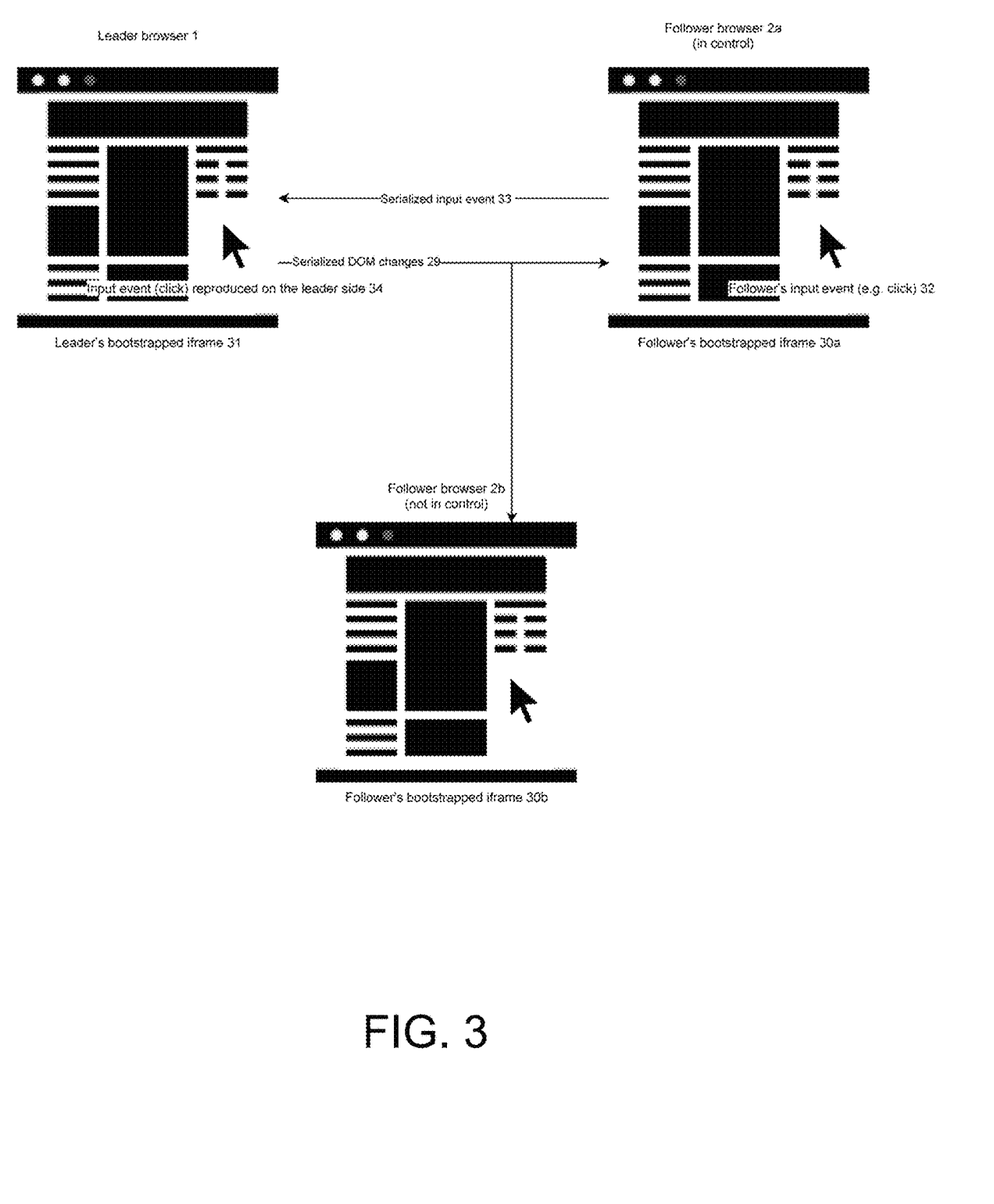
FIG. 3 is a diagram illustrating interception of user interaction events inside the bootstrapped iframes proxied in a co-browsing session in accordance with the present invention.

The following key applies to FIGS. 1-3:

A user agent (web browser) 1 comprising a DPD under the control of a user.

A user agent (web browser) 2 comprising a DPD under the control of another user.

A WAN such as an internet or intranet 3.

A leader token 18 which gives a DPD 1 full control over a co-browsed session.

A software or hardware load balancer 5 such as HAProxy.

A REST API 6.

A plurality of background computing task processes 16.

A data store such as Redis 15 (i.e., memory storage).

An HTTP accelerator 7 adapted for content-heavy dynamic web sites and APIs such as Varnish.

A communication relay server 9 for real-time user-to-user communication.

A HTTP proxy application 11 and a Web Socket proxy application 10 for rewriting unprocessed HTTP and WS requests 35 into processed requests 24, and for rewriting unprocessed response content 20, 21, 22, 23 into processed responses 25, 26, 27, 28.

A JavaScript and HTML rewrite engine processor 12 (in which a number of compute workers 12 are run on the intermediate server which apply dynamic content rewrites to the unprocessed content 20, 21, 22 and produce the modified content 26, 27, 28).

A UI web application 8 for providing a user interface for co-browsing sessions.

An HTTP cache server such as Apache Traffic Server (ATS) 14 adapted to cache unprocessed responses from the origin server for performance reasons.

A DOM state manager server process, or session store 13, where session data is stored on the co-browsing server 4 adapted to maintain the current DOM state 29 for all active sessions.

A co-browsed application server 17 (third-party).

A follower token 19 which gives a DPD 2 a co-browsing session (or "follower link").

Modified (processed) HTML/CSS content 30, 31 rendered inside web browsers 1 and 2.

DOM events 32 captured inside a follower browser 2 and passed to the leader browser in serialized form 33.

The co-browsing server 4 is accessible over a network environment 3 by a domain name 36 registered by the technology provider. This domain name may be different from the domain by which the co-browsed web application 17 is known.

The load balancer 5 implements a URL encoding scheme that allows to map all URLs of the origin application 17 to the corresponding URLs within the co-browsing domain 36. This URL encoding scheme may use the leader token 18 or the follower token 19. Therefore, it is possible to generate multiple encoded co-browsing URLs for each particular origin URL. Depending on which token was used during URL encoding, the generated URL is called "leader link" or "follower link".

A "leader" is a user who opens the leader link in a web browser 1. The leader links are handled by the HTTP proxy 11 and Web Socket proxy 10 which generate modified versions of the corresponding web pages fetched from the origin server 17. The modifications may include (but are not limited to):

a. parsing and modifying the HTML and CSS content based on the system configuration;

b. parsing and modifying Web Socket traffic based on the system configuration;

c. encoding all URLs inside the parsed content;

d. wrapping the resulting HTML documents inside an iframe within a custom UI window served by the UI application 8;

e. injecting extra client-side code into the resulting web pages;

f. modifying HTTP headers according to the system configuration;

g. replacing the original content with content fully generated by the co-browsing server.

The processing of the client-side code is done by the rewrite worker processes 12. These workers may use general-purpose Javascript parsers such as esprima or meriyah. Javascript code is reconstructed in such a way that all basic language operations (such as property setters, getters, function calls and others) are routed through special intercepting handlers ("getset handlers"). These handlers can be different in various embodiments of the invention, and are able to intercept all the communication between the application code and the web browser APIs. Depending on the configuration, "getset handlers" may change the return value of the underlying implementation, or execute a side-effect of choice. One of the common goals of getset handlers is to trigger processing for dynamically generated content, such as Javascript code executed with the 'eval( )' function.

For instance, the Javascript expression 'window.location.href="https://google.com"' (the "original expression") would be transformed into 'ss_setattr(ss_getattr(window, 'location'), 'href', "https://google.com")' (the "proxified expression"). In this case, the original expression is wrapped to create the proxified expression. The business logic of interception is implemented inside the injected 'ss_getattr( )', 'ss_setattr( )' functions which are provided by the processing engine.

In some embodiments, apart from the modification of the Javascript from the co-browsed website 17, additional extra code ("bootstrap code") is included in the proxied web pages. This extra code may prepare the client-side runtime environment inside the user's browser (1, 2) by modifying standard Javascript object descriptors and optionally exposing a number of globally accessible objects in the scope of the proxied page. This preparation is referred to as "bootstrapping". In some embodiments, the bootstrapping includes (but is not limited to):

a. instantiating a real-time bi-directional communication channel with the server 9.

This channel is subsequently used for data exchange between the participants of the co-browsing session;

b. replacing some of the standard Javascript API implementations with the customized ones;
 c. applying environment changes for cross-browser compatibility (so called polyfills);
 d. instantiating a special process for capturing the DOM changes and serializing them for subsequent transfer to the followers 2.

A "follower" is a user who opens a co-browsing link generated using a follower token 19. Generally, both leader and follower tokens are generated by the co-browsing server 4 using a REST API, and then distributed between a single leader and one or more followers by other communication channels, such as email.

The follower links are handled by the WS proxy 10 and HTTP proxy 11, which serve a special page that may:

a. instantiates a communication channel with the leader browser 1 via the communication server 9;
 b. can reproduce the DOM changes sent by the leader browser 1 to reflect;
 c. wrap the proxied content in a UI frame served by the UI application 8;
 d. executes a bootstrapping process, similar to the leader side.

In various embodiments, the follower bootstrap code may also include executing arbitrary code provided by the technology provider.

The modified version of the Javascript code of the co-browsed web site may or may not be executed inside a follower's browser. In the latter case, the only Javascript run on the DPDs of followers 2 is that needed for synchronization of DOM mutations.

As the DOM mutations are propagated from the leader to followers, various embodiments also pass them through a DOM state manager 13 process, which is configured to keep the current DOM state snapshot for all active sessions on the co-browsing server 4. This snapshot may be propagated to the followers 2 who join late, in order to provide a base page state for applying subsequent DOM mutations.

In various embodiments, one of the followers 2a may take control over a co-browsing session. In some embodiments, when a follower 2a takes control over a co-browsing session, the bootstrap code captures the follower's 2a events 32 such as clicks, scrolling and key entries, which are then serialized (33) and reproduced on the leader side (34). In this case, the event handlers are still executed on the leader's 1 DPD. If the application changes the DOM in response to those input events, these changes will appear on the leader side, and then propagated to all followers using the mechanism described above.

While in some embodiments only one leader and multiple followers may join a co-browsing session, multiple co-browsing sessions may be combined in one application, allowing the users to act as leaders or as followers in different parts of the session at the same time. The UI application 8 may then embed co-browsing iframes from different sessions, providing a single user interface over them.

In other embodiments of the co-browsing app, the leader 1 is participating in the co-browsing session without followers 2. These embodiments benefit from the middleware proxy, getset, and bootstrap modifications alone, without the content sharing functionality. In such embodiments, a plurality of leaders 1 may join a co-browsing session.

In various embodiments, the co-browsing server relies on an HTTP accelerator 7 (such as Varnish) and data structure store(s) 15 (such as Redis) for caching in-session data. This is important for performance reasons and consistency within the co-browsing session between leaders 1 and followers 2.

The majority of in-session static resources 22 may be stored using Redis and the stored responses are served to followers from Redis.

An HTTP cache server 14 such as Apache Traffic Server is included on the co-browsing server 4 and adapted to cache unprocessed responses from the origin server 17 (for performance reasons).

In various embodiments, a Content Security Policy (CSP) within the proxy server 11 may be configured to block requests which are trying to escape the sandbox. In this manner, advertisements, images, drop down menus, and other events may be dynamically modified by the proxy 11 before being served to leaders 1 and/or followers 2 in a co-browsing session.

The UI application 8 served to the leader browser 1 and follower browsers 2 may include chatbox, videochat, drawing, virtual tabs, and the like. Extra functionality, not included in the original HTML/JavaScript code, may be injected or provided to the leaders 1 and followers 2. The UI application can communicate with the bootstrapped pages using standard Web APIs such as postMessage and MessageChannel.

Typically, the server 4 comprises one or more central processing units executing software and/or firmware to control and manage the other components necessary to serve the web application. The server 4 comprises hardware and/or software more commonly referred to as a Multiple Virtual Storage (MVS), OS/390, zSeries/Operating System (z/OS), UNIX, Linux, or a Windows system.

The server 4 may comprise a server cluster with firewalls, load balancer(s), and database servers having one or RDBMS known to those of skill in the art. The server 4, in the shown embodiment, may also comprise a database management system (DBMS) or relational database management system (RDBMS), such as Oracle, MySQL, SQL, FireBird, IBM DB2®, or the like.

In various embodiments, a "Javascript sandboxing engine" rewrites the Javascript (JS) code by adding intercepting object accessors and allows customizing the behavior of these intercepted calls.

A "content-aware network proxy" is a network proxy whose behavior depends on the application traffic. Normal (non-content-aware) proxies can only make decisions based on the type of HTTP traffic. In the present invention, the proxy may introspect the actual content: HTML, JS and CSS, and applies different content transformations based on the actual content. For example, it parses HTML code and replaces HTML attributes on some elements.

The term "arbitrary web application" may mean literally "any given web application." The term "origin web application" may refer to the existing web application that is being augmented (i.e., proxied or wrapped). This can include any publicly-accessible web application.

The "proxied web application" may refer to the origin web application after it has been modified using the virtualization technology.

The "customizable web application" allows creation of applications which augment other existing application. It is an object of the present invention that these applications augment the browsing experience by adding sharing functionality and adding new features to the browsed pages.

Figure 4A:
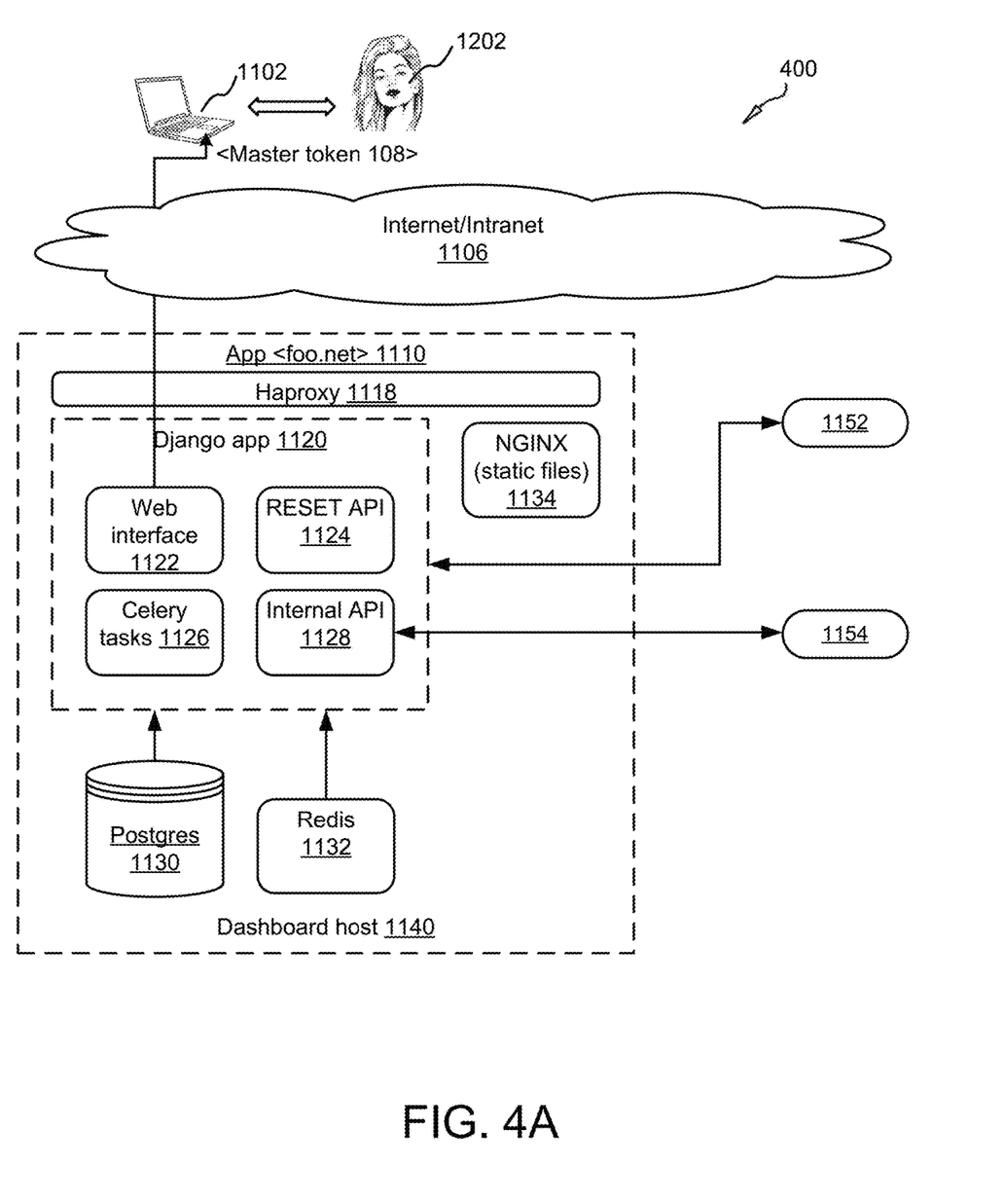
FIG. 4A is a relationship diagram illustrating the logical architecture forming the co-browsing system for wrapping (including proxying) a web application to a plurality of third parties in accordance with the present invention.
Figure 4B:
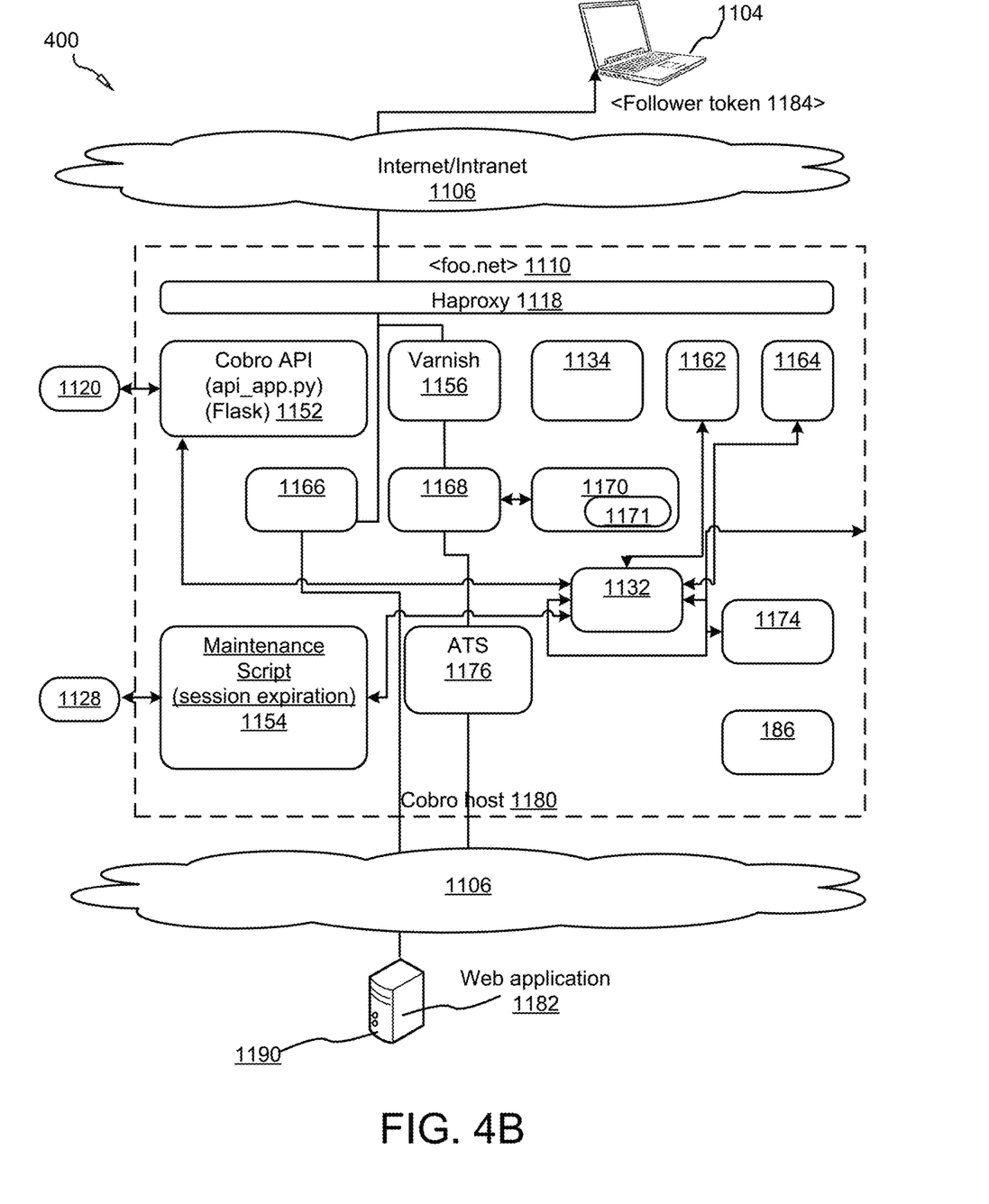
FIG. 4B is a relationship diagram illustrating the logical architecture forming the co-browsing system for wrapping a web application to a plurality of third parties in accordance with the present invention.

FIGS. 4A-4B illustrate a relationship diagram of the logical architecture forming the technology provider's co-browsing system 400 for proxying a wrapped web application to a plurality of third parties in accordance with the present invention.

Figure 5:
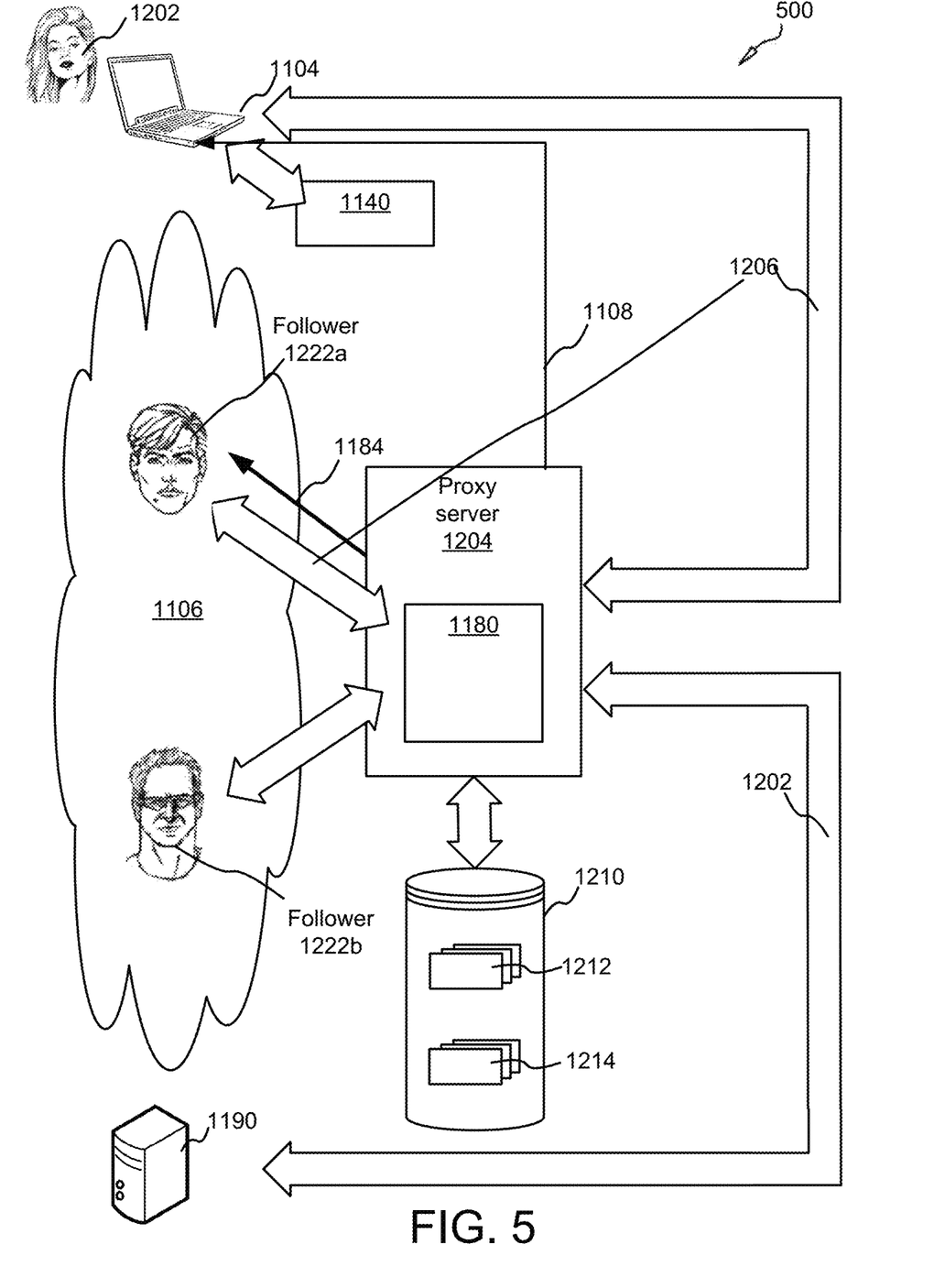
FIG. 5 is a data-entity relationship diagram illustrating a co-browsing system for proxying/wrapping a web application to a plurality of third-parties in accordance with the present invention.

The following key applies to FIGS. 4A-5:

An agent 1102 comprising a DPD under the control on intermediate user.

A terminal unit 1104 comprising a DPD under the control on an end user 1202.

A WAN such as an internet or intranet 1106.

A master/leader token 1108 which gives a DPD 1102 full control over a co-browsed session (also called a "leader link").

A server name 1110 comprising a URL.

A proxy server 1118 such as HAProxy 1118.

A dashboard web interface 1122.

A REST API 1124.

Celery tasks 1126.

A dashboard internal API 1128.

An RDBMS 1130 such as Postgres or SQL.

A data structure store such as Redis 1132.

A dashboard host 1140.

A webserver or load balancer such as NGINX 1134 deployed to serve HTTP content.

A Cobro API 1152.

A maintenance script 1154.

An HTTP accelerator 1156 adapted for content-heavy dynamic web sites and APIs such as Varnish.

A session frame 1162.

A WSHub 1164.

A web service proxy 1166 such as PAWS.

A WSGI application 1168.

A JavaScript processor 1170 (in which Node.js workers 1171 are run on the intermediate server which apply Javascript object descriptor wrappers 1186 for JavaScript processing).

An Apache Traffic Server (ATS) 1176 adapted to cache unprocessed responses from the origin server for performance reasons.

A node.js server process, or session store 1174, where session data is stored on the Cobro host 1180 adapted to maintain the current DOM state for all active sessions.

A co-browsed application 1182.

A follower token 1184 which gives a DPD 1104 full control over a co-browsed session (or "follower link" 1184).

A generic framework comprising functions adapted to dynamically override JavaScript code is included in computer-readable memory 1210 on the intermediate server (for instance Javascript object descriptor wrappers 1186 (also called a "getset handler" 1186)). This memory 1210 comprises logs 1212 (stdout/stderr) which can be captured by journald and queried with jornalctl in some embodiments.

A Cobro host 1180 which is deployed on all servers except the dashboard server(s) 1140. For the purposes of this disclosure, the term "Cobro" denotes the core functionality of the technology provider and the server sessions involved, as well as the functions and features which begin executing on multiple servers when users 1104 and/or agents 1102 join a session. However, the term "Cobro host" 1180 denotes the Cobro components running on every DPD/server except the DPD/server running the dashboard host 1140.

It is an object of the present invention to provide links 1108, 1184 to a plurality of different users wanting to participate in a co-browsing session using servers 1102, 1104. These links 1108, 1184—or tokens 1108, 1184—are provided by the technology provider controlling the intermediate server 1204 running a smart sandbox app to prospective participants of a co-browsing session 1500.

A smart sandbox is provided by the technology provider which is programmed to trap and override JavaScript calls and HTTP requests.

A "leader" is a user 1202 who opens the master link 108. The JavaScript on a co-browsed website is executed inside a leader's browser only. DOM mutations are captured and propagated to the followers 1222 who access the co-browsing session 1500 with follower links 1184 using WebSockets. The only JavaScript run on the servers/DPDs of followers 1222 is that needed for synchronization.

In various embodiments, a follower 1222 may take control over a co-browsing session 1500. In some embodiments, when a follower 1222 takes control over a co-browsing session, the Cobro app captures the follower's 1222 events such a clicks, scrolling and key entries, but the event handlers are still executed on the leader's 1202 DPD. A plurality of followers 1222 may join a co-browsing session, but only one leader 1202 (or master) 1102 may join in some embodiments. In other embodiments of the Cobro app, only one leader 1102 is participating in the co-browsing session without followers 1222 on Cobro nodes. In those embodiments involving multiple servers, the dashboard host 1140 is run only one of the servers (that of the leader 1202). The servers 1104 of followers 1222 running Cobro are referred to herein as "Cobro nodes." In some embodiments, a plurality of leaders 1202 may join a co-browsing session 1500 as provided herein.

FIG. 5 is a data-entity relationship diagram illustrating a co-browsing system 500 for proxying/wrapping a web application to a plurality of third-parties in accordance with the present invention.

The origin server is indicated at 1190. The origin server 190 is in logical communication with a proxy server 1204 which is in logical communication with a plurality of followers 1222 (running Cobro nodes). A leader token 1108 is forwarded by the sandbox to the leader 1202 while follower tokens 184 are forwarded to the followers 1222.

Figure 6A:
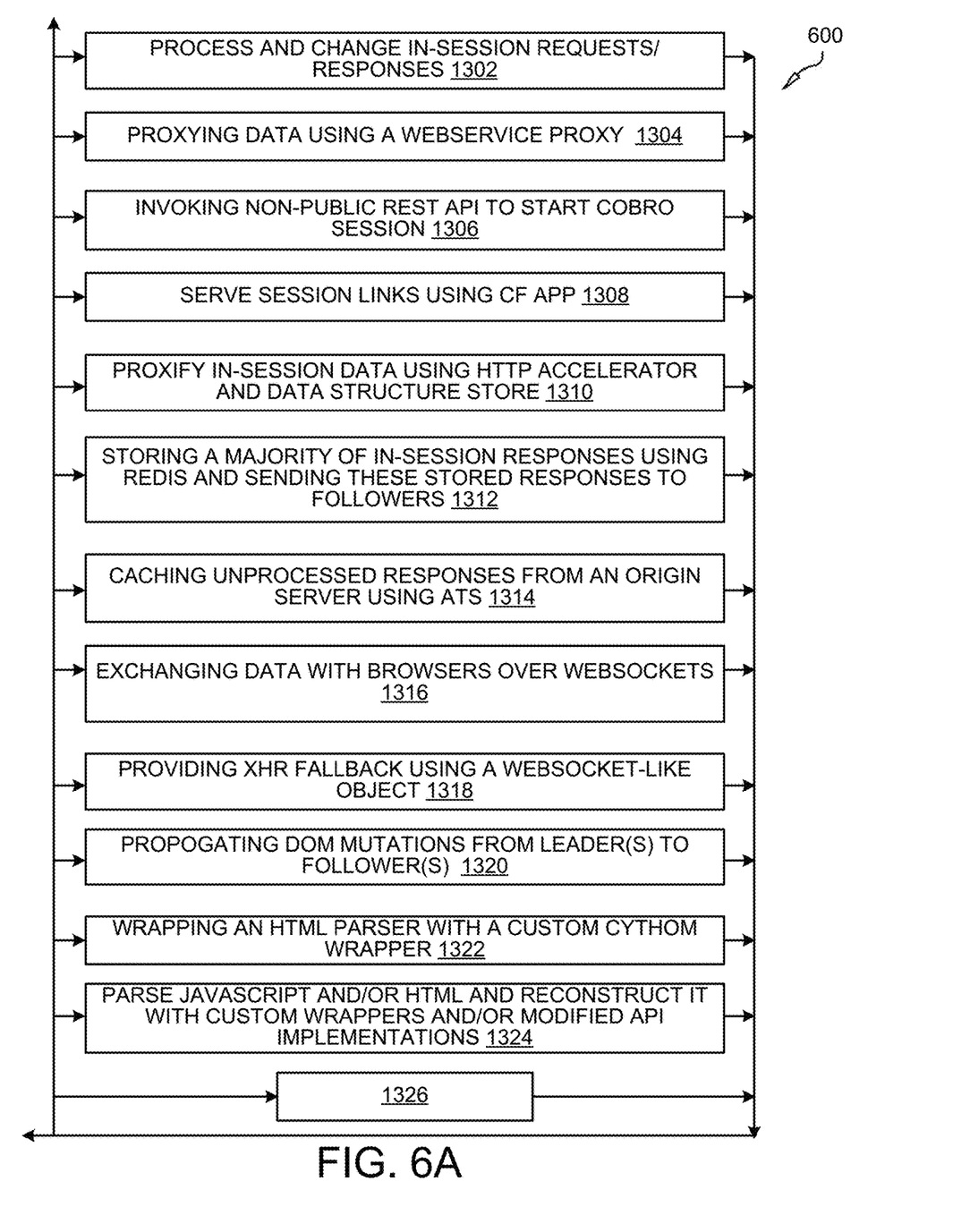
FIG. 6A is a flow chart illustrating the steps of a method of wrapping/proxying a session in accordance with the present invention.
Figure 6B:
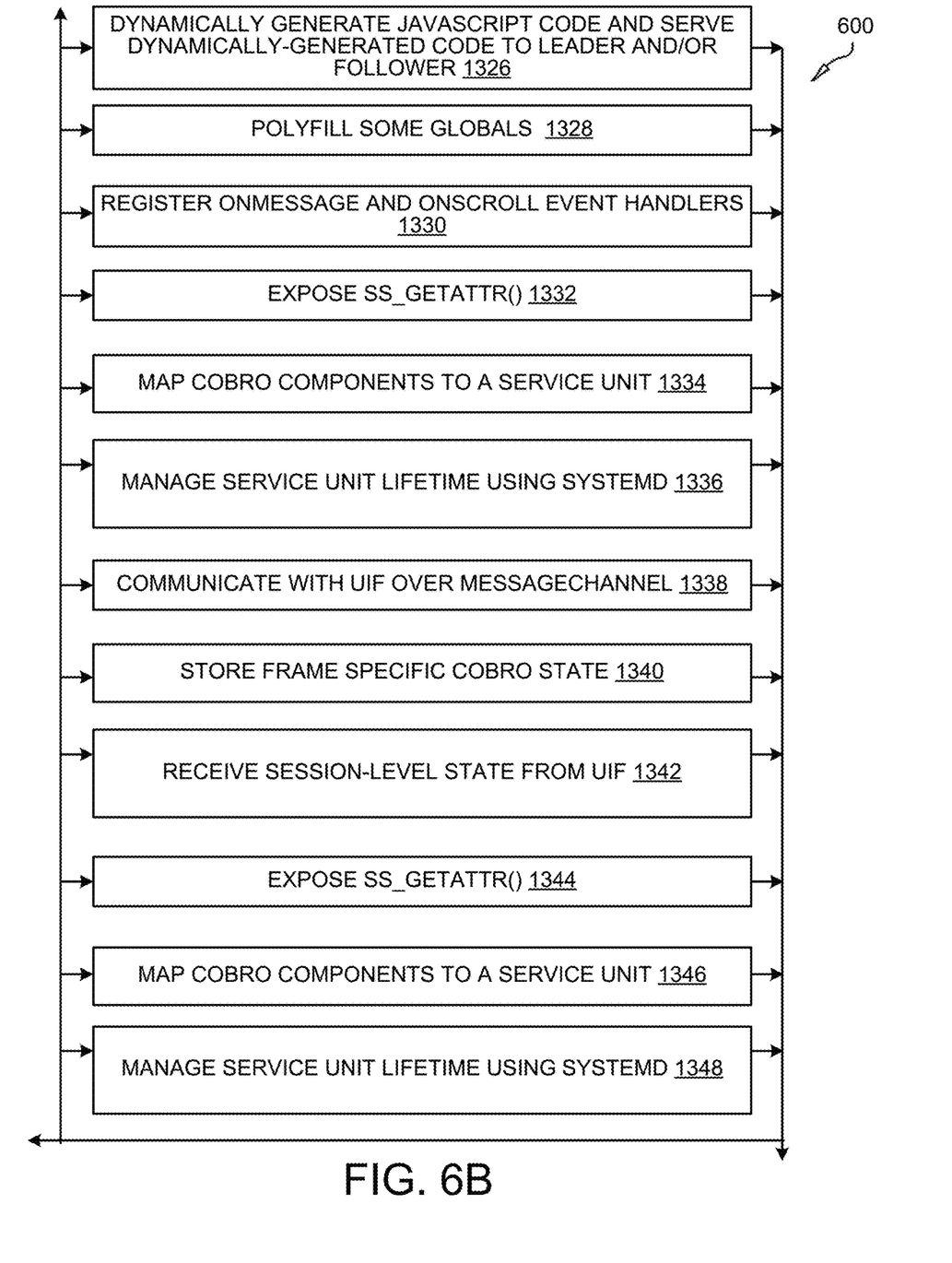
FIG. 6B is a flow chart illustrating the steps of a method of wrapping/proxying a session in accordance with the present invention.

FIGS. 6A-6B are flow charts illustrating the steps of a method 600 of wrapping/proxying a session in accordance with the present invention.

As shown, the Cobro methodology includes a step 1302 of processing and changing in-session requests/responses. This may be accomplished using a proxy app such as Python WSGI run under gevent to provide a high-level synchronous API on top of an event loop.

Proxying 1304 traffic using a web service proxy, which webservice proxy may be or comprise a WebSocket proxy working alongside the HTTP proxy for processing Web Socket traffic. Once a connection is established with the originating server, Cobro puts a thin layer of code on top of the Web Sockets, or communications protocols used in TCP connections, and passes data through the intermediate server 1204 without analyzing or manipulating it.

A non-public REST API 1124 on the dashboard host 1140 may be invoked 1306 to start a Cobro session. In various embodiments, this non-public REST API 1124 may be termed a "Cobro API" and implemented using a WSGI web application framework such as Flask.

The dashboard host 140 and/or the Cobro host 1180 may comprise other Flask app(s) adapted to serve session links during a co-browsing session 1500, for instance a "CF app."

In various embodiments, Cobro relies on an HTTP accelerator (such as Varnish) and data structure store(s) (such as Redis) for caching (i.e., "proxifying") in-session data to one or more followers 1222 and/or leaders 1202. This is important for performance reasons and consistency within the co-browsing session 1500 between leaders 1202 and followers 1222, who may both be prompted to authenticate using randomized content APIs (such as CAPTCHA).

The majority of in-session responses 1214 are stored using Redis and the stored responses are proxied 1312 to followers from Redis.

An Apache Traffic Server (ATS) 1176 in included on the Cobro host 1180 and adapted to cache unprocessed responses from the origin server 1190 (for performance reasons).

A Web Socket-like object is used to provide 1316 XHR fallback, for instance SockJS. The server side may be implemented in Go (a programming language).

DOM Mutations are propagated 1320 from leaders to followers during a co-browsing session 1500. In various embodiments, this propagation is realized using a Node.JS server process 1170 configured to keep the current DOM state active for all active sessions in the co-browsing session 1500. In some embodiments, other JavaScript run-time environments may be used by the JavaScript processor 1170 in place of Node.JS 1171 which allow scripts outside of a browser.

Wrapping 1322 a HTML parser (such as a Google streaming HTML parser) with a custom Cython wrapper (or Python or C). Esprima may be used, in some embodiments, for processing and parsing JavaScript programs in this manner while other variations of JavaScript, such as Flow and TypeScript, may be parsed using other tools.

The generic framework (or Javascript object descriptor wrappers) 1186, comprising functions adapted to dynamically override JavaScript code, is included in computer-readable memory in Cobro on the client side browser. When HTML and/or JavaScript come through the proxy server into the sandbox, Cobro parses all of the JavaScript code then reconstructs it, adding custom wrappers and/or changing the API implementations as part of Cobro and the technology provider's larger effort to implement co-browsing of the website at the origin server.

For instance, the JavaScript expression 'window.location.href="https://google.com"' (the "original expression") would be transformed into 'ss setattr(ss getattr (window, 'location'), 'href', "https://google.com")' (the "proxified expression"). In this case, the original expression is wrapped to create the proxified expression. The URL of the web application in session with the technology provided is overridden such that all secondary requests are routed through the technology provider's proxy server. In various embodiments, extra logic is provided on the proxy server 1204 which allows restricted resources on a web page to be requested from a domain outside the URL serving the resources.

In various embodiments, a CSP policy within the proxy server 1204 may be configured to block requests which are trying to escape the sandbox. In this manner, advertisements, images, drop down menus, and other events may be dynamically modified by Cobro before being served to leaders 1202 and/or followers 1222 in a co-browsing session. The intermediate server, or proxy server 1204, receives code 1202 and processes JavaScript resources coming through the proxy and/or sandbox (to be served to the end DPD/servers 1102, 1104) to generate 1326 dynamically-created JavaScript 1206 which is served to users 1202, 1222 who receive the dynamically-generated JavaScript 1206 proxied from Cobro (the proxy server 1204 may be a plurality of servers, a server cluster, or a plurality of logically-connected DPDs as known to those of skill in the art).

Node.js workers 1171 are run in Cobro by the JavaScript processor 170 which applies Javascript object descriptor wrappers 1186 for JavaScript processing to proxify the original JavaScript code 1202.

The leaders 1202 and followers 1222 receive the proxified JavaScript 1206, or JavaScript modified the Javascript object descriptor wrappers/worker 1186, or actual implementation of Cobro wrappers (for example "preprocess_SCRIPT_src( )" or "call_document_write( )"). The leader's 1202 and followers' 222 user interfaces may include chatbox, videochat, drawing, virtual tabs, and the like. Extra functionality, not included in the original HTML/JavaScript code, may be injected or provided to the leaders 1202 and followers 1222.

Typically, the server 1190 comprises one or more central processing units executing software and/or firmware to control and manage the other components necessary to serve the web application. The server 1190 comprises hardware and/or software more commonly referred to as a Multiple Virtual Storage (MVS), OS/390, zSeries/Operating System (z/OS), UNIX, Linux, or a Windows system.

The server 1190 may comprise a server cluster with firewalls, load balancer(s), and database servers having one or RDBMS known to those of skill in the art. The server 190, in the shown embodiment, may comprise a database management system (DBMS) or relational database management system (RDBMS), such as Oracle, MySQL, SQL, FireBird, IBM DB2®, or the like.

The server 1190 is in logical communication with the proxy server 1204 and Cobro through a networked environment 1106, such as the Internet and/or a local area network (LAN) or wide area network (WAN). The server 1190 may comprise a smartphone or tablet computer, typically operating with a static IP address.

Figure 7:
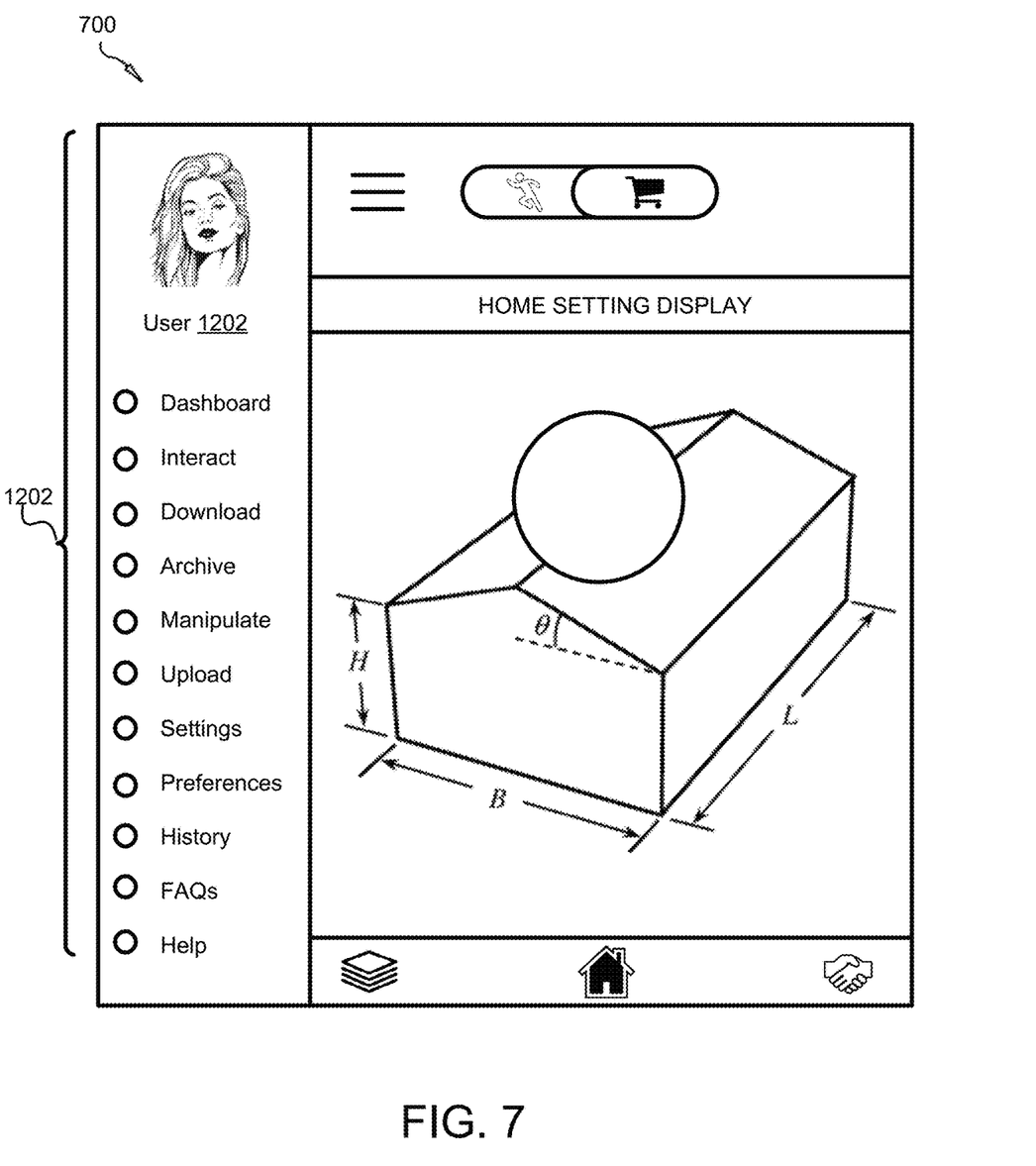
FIG. 7 illustrates exemplary HTML, code displayed in a browser in accordance with the present invention.

FIG. 7 illustrates exemplary HTML code displayed in a browser 700 in accordance with the present invention.

As illustrated in FIG. 7, a system 700 facilitates co-browsing of HTML and JavaScript 1202 originating with an origin server 1190. The system 700 distributes control of a communication session to a plurality of users 1202, 1222. In the embodiments described herein, the communication session is held in accordance with a hypertext transfer protocol, http, and the domains are internet domains. These internet domains are defined by means of a uniform resource locator, URL, known to those of skill in the art.

What is depicted is a frame 700 of the HTML, and JavaScript code originating with the server 1190 as it would appear on the browser of a typical user who has authenticated with the web application during a communication session. The system 700 transparently brokers, or distributes, the ability to interface with the web application to a plurality of other users 1202, 1222 by serving not just a projection of the code 1202, but the code 1202 itself, in modified form 1206 as further provided herein.

Figure 8:
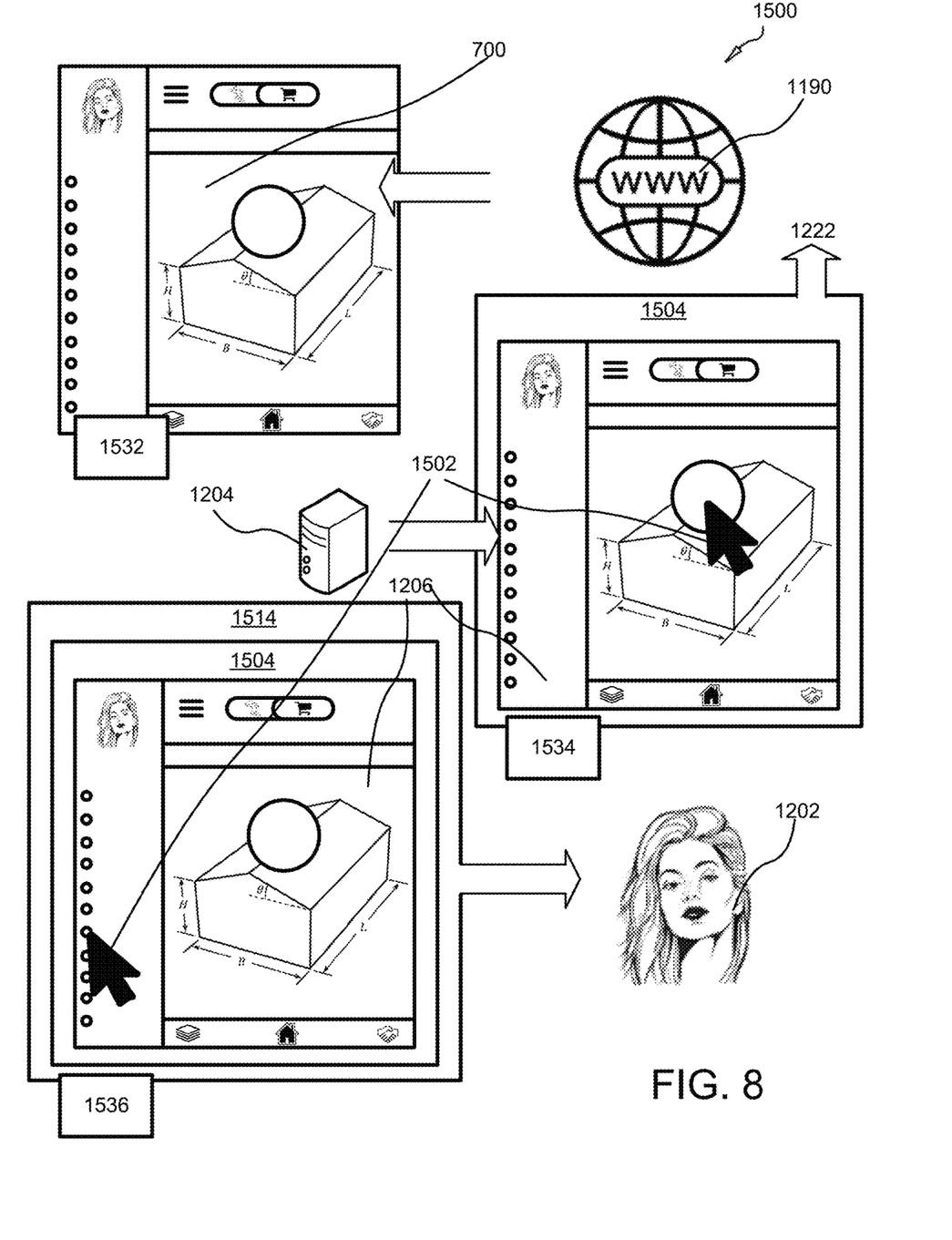
FIG. 8 is block diagram illustrating iframes proxied in a co-browsing session in accordance with the present invention.

FIG. 8 is block diagram illustrating iframes proxied in a co-browsing session 1500 in accordance with the present invention.

The original code 1202 is proxified frame-by-frame to users 1202, 1222 after being prepared. The DPDs 1102 of leaders 1202 execute a script which may be entitled master.js 1532 while the follower's 1222 machines 1104 execute a script which may be entitled follower.js 1534. These are "bootstrap scripts" which are prepared (or bootstrapped) by Cobro. Cobro polyfills 1328 some globals, registers 1330 required WebSocket event handlers such as onmessage and onscroll, and exposes 1332 select globals such as ss_getattr( ).

Every component of Cobro is mapped 1334 to a service unit whose lifetime is managed 1336 by systemd, a suite of Linux building blocks.

The original frame 700 is bootstrapped with the script master.js 1532 and nested as shown. The frames may be bootstrapped with follower.js 1534 as shown. The nested iframes 1504, 1514 may be displayed to leaders 1202 and/or followers 1222.

In various embodiments in which Cobro provides co-browsing functionality with multi-leaders 1202, the frame-specific Cobro state is stored 1340 and Cobro receives 1342 session-level state from the user interface frame (UIF) such as current control state, window names, and the like.

When an iframe is bootstrapped, the UIF is pinged and Cobro pings a MessageChannel port the UIF. Cobro receives postMessage messages from the UIF and dispatches them within the current frame. Cobro keeps an up-to-date registry of reachable windows and their names using IDX provided by the UIF. The local registry of windows is used by implementations of window_open( ) and handle_target( ).

WebSocket Message Ports are sent directly to a frameid corresponding to a bootstrapped frame. The proxified frames are updated about available window names corresponding locations in the frame tree by IDX in window.frames list.

WebWorker runs the script socket_worker.js and manages the connection to wehub. Tab-sessions are multiplexed over one Web Socket.

Using this methodology, cross-frame communications have to become asynchronous. This asynchronicity is achieved during frame initialization wherein the bootstrap script creates a MessageChannel pipe to communicate with the UI frame and subsequently sends a postMessage to window.parent comprising the current window name and the port of the MessageChannel. This postMessage is received by the already bootstrapped parent window. The frame element's service set identifier (SSID) is appended to the frameid and the postMessge is passed up to the UI frame. Every window updates the frameid as the postMessage is passed.

Once the UI frame receives the message with the full frameid and a MessagePort that is directly connected to the originating frame, the UI frame updates its own registry of the currently loaded frames and pushed the current session state to the new frame using the provided MessagePort.

Finally, the newly bootstrapped frame updates its inner state with the new data.

The nested iframes all communicate by postMessages. Every frame 1504, 1514 contains unique pieces of code generated by Cobro. Each frame 1504, 1514 drops the document. domain to provide direct access to the frame.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured to establish a dynamically-enhanced browsing session with an arbitrary web application and transparently proxy said arbitrary web application to one or more users, the system comprising:

a JS/HTML rewrite engine processor configured to produce modified content by rewriting to the unprocessed content in computer-readable memory;

a load balancer configured to implement a URL encoding scheme permitting mapping of all URLs of an origin web application to corresponding URLs within the proxied web application, said URL encoding scheme making use of one of a leader token and a follower token, wherein URLs of the origin web application encoded using the leader token are leader links and URLs of the origin web application encoded using the follower token are follower links;

a user interface (UI) application configured to serve a customizable web application implementing functionality on top of the proxied web application;

a proxy comprising: (1) an HTTP proxy application adapted to work in connection with a WebSocket (WS) proxy application; and (2) the WebSocket proxy application configured to work with the HTTP proxy application, the proxy configured to rewrite unprocessed HTTP and WS requests into processed requests, and rewrite unprocessed response content into processed content in response to a user opening a leader link, by:

parsing and modifying HTML and CSS content of the origin web application using a system configuration, parsing and modifying Javascript content of the origin web application using the system configuration, parsing and modifying WebSocket traffic using the system configuration, encoding all URLs inside the parsed content, wrapping HTML documents inside an iFrame within a custom user interface window served by the user interface application, injecting additional client-side code into the processed request, modifying HTTP headers using the system configuration, and replacing original content with content generated by the proxy;

a rewrite worker processor comprising a Javascript parser configured to reconstruct Javascript code by routing one or more of property setters, getters, and function calls to a plurality of getset handlers adapted to change return values of communications between the origin web application and the user's web browser, and between the client-side part of the origin web application and its server-side part; and a co-browsing server.

2. The system of claim 1, wherein the Javascript code reconstructed by the Javascript parser is adapted to trigger processing for dynamically generated content, including Javascript code executed with an "eval( )" function.

3. The system of claim 1, wherein the reconstructed Javascript code is termed a "proxified expression."

4. The system of claim 1, further comprising a bootstrapper configured to add "bootstrap code" in the proxified expression adapted to modifying standard Javascript object descriptions and expose a number of globally-accessible objects within the proxied web application by:
   replacing standard Javascript API implementations with customized Javascript API implementations;
   applying environmental changes for cross-browser interoperability (i.e., "pollyfills"); and
   instantiating a process for capturing DOM changes and serializing said DOM changes for subsequent transfer to a follower using the follower link generated using a follower token.

5. The system of claim 4, wherein the bootstrapper is further configured to instantiate a real-time bidirectional communication channel with the co-browsing server and to use said communication channel to exchange data between the arbitrary web application and the origin web application.

6. The system of claim 1, wherein follower tokens and leader tokens are generated by the co-browsing server using a REST API; and wherein the co-browsing server is in communication with a single leader and a plurality of followers.

7. The system of claim 6, wherein the proxy is further configured to serve a follower web page at follower links by instantiating a communication channel with the proxied web application of the leader and:
   reproducing DOM changes sent by the leader's modified (i.e., "proxied") web application;
   wrapping proxied content in a UI frame served by the user interface application; and
   executing a bootstrapping process.

8. The system of claim 1, wherein the modified Javascript code (of the co-browsed web application) is executed inside a proxied web application of the leader.

9. The system of claim 1, further comprising a DOM state manager configured to create a snapshot in computer-readable memory of the current DOM state for all active sessions of the co-browsing server, wherein DOM mutations are propagated from a browser of the leader to browsers of followers.

10. The system of claim 4, wherein the bootstrapper is further configured to:
   capture events on a follower's browser, including clicks, scrolling and key entries;
   serialize said events; and
   reproduce said events on the leader's browser, triggering corresponding Javascript event handlers in response to said events on the leader's browser being reproduced.

11. The system of claim 1, wherein the UI application is further configured to embed co-browsing iFrames from multiple co-browsing sessions in a single application and to provide a single user interface over said multiple co-browsing sessions.

12. The system of claim 1, wherein the co-browsing server comprises an HTTP accelerator and a plurality of data structure stores for caching in-session data adapted to store in-session static resources.

13. The system of claim 12, wherein the HTTP accelerator is Varnish™ and one of the data structure stores is Redis™.

14. The system of claim 1, wherein the co-browsing server further comprises a content security policy (CSP) in computer-readable memory itemizing requests which are to be blocked by the co-browsing server before the modified Javascript code is served, including requests intended to transfer data outside the co-browsing server originating with advertisements, images, and drop-down menus.

15. The system of claim 1, further comprising: an HTTP cache server configured to cache unprocessed responses from the origin server for performance reasons.

16. A computer-implemented method for establishing a dynamically enhanced browsing session with an arbitrary web application and transparently proxying said arbitrary web application to one or many users, the steps of the method comprising:
   establishing a communication session between: (a) a proxy server and (b) a web application served at a URL resolving to an origin server;
   generating one or more unique URLs which resolve to the proxy server and serve a wrapped web application with dynamically added functionality in addition to those provided by the origin server;
   distributing the generated unique URLs among one or more participating user agents, of which one user agent serves as a "leader" and other as "followers";
   injecting intercepting hooks into client-side code of the arbitrary web application, including event handlers, recurrent tasks, DOM construction logic and/or any other functionality configured by the user;
   executing the modified client-side code in the leader user agent;
   capturing DOM content and its mutations and propagating them from the leader to the followers of the co-browsing session;
   capturing user interaction events (such as input or page scrolling) in follower user agents and propagating them to the leader user agent for processing ("control switching" functionality);
   achieving symmetrical user experience for multiple co-browsing users through the composition of co-browsing sessions, allowing each user agent act as a leader inside a corresponding browsing context;
   embedding aforementioned co-browsing contexts in nested iframes within a custom UI application, that orchestrates them by the means of standard browser APIs such as postMessage and MessageChannel;
   running a set of server-side components that store and manage the state of the browsing sessions and allow for successful session restoration in the event of lost network connection with one or more user agents;
   providing, by a pluggable framework, a full virtualization of a third-party web application using a combination of:
      a content-aware network proxy able to intercept and rewrite traffic up to the application layer, including HTTP requests and responses, WebSocket traffic and other commonly used web communication protocols;
      a Javascript sandboxing engine able to intercept and redefine expressions in Javascript source code such as function calls, property descriptors (getters/setters) and metaprogramming features such as 'eval( )' and Reflect API, The sandbox transformations can be applied during the network traffic processing as well as on the client side, by the user agent (web browser);
   HTML and CSS rewrite engines capable of changing certain values in the corresponding source code (such as URLs and attribute values), for ensuring a transparent browsing experience and/or intentional changes, e.g. by providing security and privacy functionality;
   a set of application programming interfaces (APIs) allowing a user to configure the behaviour of intercepting handlers of the virtualization framework, and/or provide custom implementations of those handlers.

\* \* \* \* \*